US009172752B2

(12) United States Patent
Dorso et al.

(10) Patent No.: US 9,172,752 B2
(45) Date of Patent: Oct. 27, 2015

(54) COMMUNICATING WITH A USER DEVICE

(71) Applicant: TangoMe, Inc., Palo Alto, CA (US)

(72) Inventors: Gregory Dorso, San Jose, CA (US); Uri Raz, Palo Alto, CA (US); Eric Setton, Menlo Park, CA (US)

(73) Assignee: TangoMe, Inc., Mountain View, CA (US)

( * ) Notice: Subject to any disclaimer, the term of this patent is extended or adjusted under 35 U.S.C. 154(b) by 205 days.

(21) Appl. No.: 13/802,021

(22) Filed: Mar. 13, 2013

(65) Prior Publication Data

US 2013/0198394 A1 Aug. 1, 2013

Related U.S. Application Data

(62) Division of application No. 12/876,153, filed on Sep. 5, 2010.

(60) Provisional application No. 61/240,223, filed on Sep. 6, 2009.

(51) Int. Cl.
G06F 15/16 (2006.01)
H04L 29/08 (2006.01)
H04L 29/06 (2006.01)
G06F 11/20 (2006.01)

(52) U.S. Cl.
CPC ............ *H04L 67/104* (2013.01); *G06F 11/202* (2013.01); *H04L 65/1069* (2013.01)

(58) Field of Classification Search
USPC .................. 709/227, 231, 236, 204, 201, 202
See application file for complete search history.

(56) References Cited

U.S. PATENT DOCUMENTS

| 5,544,300 | A | 8/1996 | Skarbo et al. |
| 5,717,857 | A | 2/1998 | Burkman et al. |
| 5,887,139 | A | 3/1999 | Madison, Jr. et al. |
| 6,243,645 | B1 | 6/2001 | Moteki et al. |
| 7,574,523 | B2 | 8/2009 | Traversat et al. |
| 7,948,913 | B1 * | 5/2011 | Dinan .......................... 370/252 |
| 8,180,915 | B2 | 5/2012 | Zhao |
| 8,289,365 | B2 | 10/2012 | De Lind Van Wijngaarden et al. |
| 8,479,222 | B2 * | 7/2013 | Chavan ........................ 719/329 |
| 8,495,236 | B1 * | 7/2013 | Glasser ........................ 709/231 |
| 2002/0143855 | A1 | 10/2002 | Traversat et al. |
| 2005/0047390 | A1 | 3/2005 | Park et al. |
| 2006/0242227 | A1 | 10/2006 | Rao et al. |
| 2006/0282855 | A1 | 12/2006 | Margulis |
| 2007/0124308 | A1 | 5/2007 | Johnson et al. |
| 2007/0157303 | A1 | 7/2007 | Pankratov |
| 2007/0280255 | A1 | 12/2007 | Tsang et al. |
| 2008/0115185 | A1 | 5/2008 | Qiu et al. |
| 2008/0215681 | A1 | 9/2008 | Darcie et al. |
| 2009/0006850 | A1 | 1/2009 | Birger et al. |
| 2009/0106393 | A1 | 4/2009 | Parr et al. |
| 2009/0153646 | A1 * | 6/2009 | Bourguignon et al. .... 348/14.11 |
| 2009/0167633 | A1 | 7/2009 | Cohen et al. |

(Continued)

*Primary Examiner* — Lan-Dai T Truong

(57) ABSTRACT

A methods and systems for communicating are disclosed. A request is received at a first device to communicate with a second device. Contact is initiated with the second device via a data center. A first form of communication is transmitted to the second device without requiring the transmitting to be routed through a central server. The first form of communication is received from the second device without requiring the receiving to be routed through a central server. A second form of communication is transmitted to the second device without requiring the transmitting to be routed through a central server.

15 Claims, 11 Drawing Sheets

(56) References Cited

U.S. PATENT DOCUMENTS

| | | |
|---|---|---|
| 2009/0268093 A1 | 10/2009 | Ishihara |
| 2009/0300673 A1 | 12/2009 | Bachet et al. |
| 2010/0111095 A1 | 5/2010 | Trossell et al. |
| 2010/0245534 A1 | 9/2010 | De Lind Van Wijngaarden et al. |
| 2010/0319020 A1 | 12/2010 | Yuen et al. |
| 2011/0153782 A1 | 6/2011 | Zhao |
| 2013/0198394 A1* | 8/2013 | Dorso et al. .................. 709/227 |
| 2014/0052821 A1* | 2/2014 | Prasad ......................... 709/218 |

* cited by examiner

Process
200

A tracker peer is contacted and a list of peer nodes are obtained at a user device.
202

An optimization procedure based on factors relating to the peer nodes of the list of peer nodes is employed.
204

A subset of peer nodes are selected from the list of peer nodes to act as relay nodes for a communication.
206

An appropriate compression scheme is selected for the communication at said user device.
208

A media format is selected for the communication.
210

A type of encoding is selected for the communication.
212

Data is transmitted to at least one relay node for the at least one relay node to forward to at least one other user device, wherein the relay node is one of the subset of the peer nodes.
214

Data is received at the user device from the at least one relay node forwarded from the at least one other user.
216

Data is transmitted to a second relay node for the second relay node to forward to the at least one other user device, wherein the second relay node is one of the subset of the peer nodes.
218

Data is received from the second relay node forwarded from the at least one other user.
220

FIG. 2

Process
1000

Data associated with a contact list is received at a computer system from a handheld device, wherein the data was sent automatically from the handheld device without requiring actions from a user.
1002

The data associated with the contact list is normalized using an algorithm.
1004

The normalized data is compared with data in a database.
1006

Contact matches are established between the data associated with the contact list and contacts in the database.
1008

The matches are reported to the handheld device.
1010

FIG. 10

Process
1100

```
┌─────────────────────────────────────────────────────────────────────────┐
│ A tracker peer is contacted and obtaining a list of peer nodes at a user device. │
│                                    1102                                  │
└─────────────────────────────────────────────────────────────────────────┘
                                     │
                                     ▼
┌─────────────────────────────────────────────────────────────────────────┐
│  A subset of peer nodes are selected from the list of peer nodes to act as relay │
│                        nodes for a communication.                        │
│                                    1104                                  │
└─────────────────────────────────────────────────────────────────────────┘
                                     │
                                     ▼
┌─────────────────────────────────────────────────────────────────────────┐
│ A first form of communication is transmitted to at least one relay node for the │
│  at least one relay node to forward to at least one other user device, wherein │
│            the relay node is one of the subset of the peer nodes.         │
│                                    1106                                  │
└─────────────────────────────────────────────────────────────────────────┘
                                     │
                                     ▼
┌─────────────────────────────────────────────────────────────────────────┐
│  The first form of communication is received at the user device from the at │
│      least one relay node forwarded from the at least one other user.     │
│                                    1108                                  │
└─────────────────────────────────────────────────────────────────────────┘
                                     │
                                     ▼
┌─────────────────────────────────────────────────────────────────────────┐
│ A second form of communication is transmitted to the at least one relay node │
│ for the at least one relay node to forward to the at least one other user device, │
│         wherein the relay node is one of the subset of the peer nodes.    │
│                                    1110                                  │
└─────────────────────────────────────────────────────────────────────────┘
```

FIG. 11

COMMUNICATING WITH A USER DEVICE

RELATED APPLICATIONS

This application is a divisional of and claims priority to the copending U.S. patent application Ser. No. 12/876,153, entitled "COMMUNICATING WITH A USER DEVICE" with the filing date of Sep. 6, 2010, which is herein incorporated by reference in its entirety.

The present application also benefits from provisional U.S. Application No. 61/240,223, filed Sep. 6, 2009, entitled "System for Multi-Way Communication", by Uri Raz, et al, assigned to the assignee of the present application, and incorporated by reference in its entirety herein.

BACKGROUND

Modern technology provides for a variety of communication means and methods. For example, there are many types of communications including voice calls, video calls, text messages, photo messages, etc. Additionally, communication may be one-to-one or multi-party communications. Typically multi-party communications are accomplished by a plurality of devices communicating with a central infrastructure. For example, a central infrastructure may be a central computer server or a group of computer servers maintained in a server farm. A central infrastructure may be expensive to establish, maintain and operate.

Many advances have been made in mobile handheld technology. Specifically smart phones have increasingly more features. There is an increased demand to develop the functionality of the smart phones and their components. For example, some smart phones now have two cameras, one mounted on the front and one on the back. Additionally, smart phones may have more than one method of connecting to a network to transmit data. These features can be used to provide a more comprehensive communication experience.

BRIEF DESCRIPTION OF THE DRAWINGS

FIG. 2 illustrates a flowchart of an example method for communicating in a peer-to-peer computer environment in accordance with embodiments of the present technology.

FIG. 10 illustrates a flowchart of an example method for automatic contact filtering in accordance with embodiments of the present technology.

FIG. 11 illustrates a flowchart of an example method for communicating in accordance with embodiments of the present technology.

Figure 1:
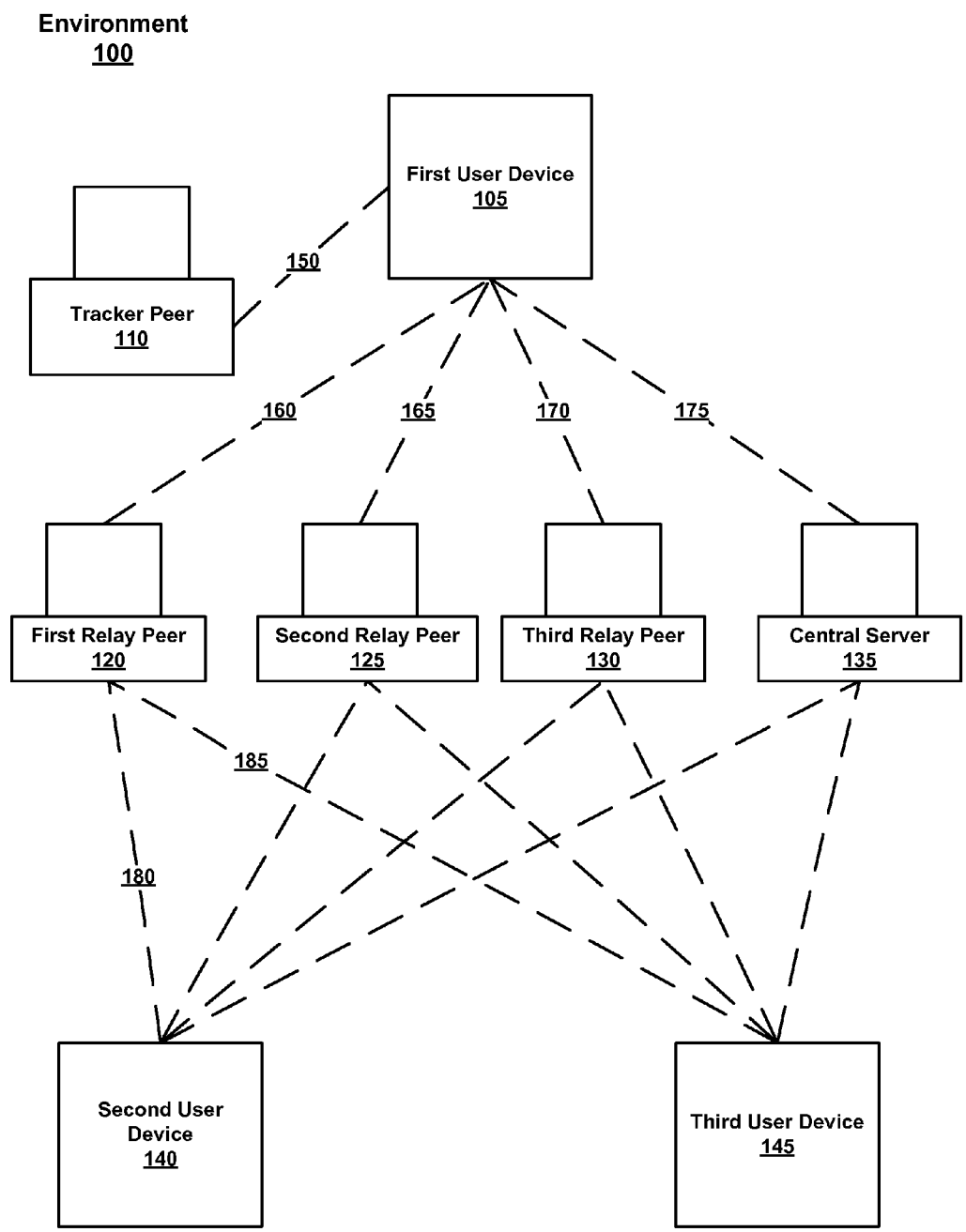
FIG. 1 illustrates a block diagram of an example environment for communicating in a peer-to-peer computer environment in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "contacting," "selecting," "employing," "receiving," "providing," "sending," "terminating," "transmitting," "communicating," "transcoding," "displaying," "enabling," "initiating," "normalizing," "establishing," "reporting," or the like, refer to the actions and processes of a computer system, or similar electronic computing device. The computer system or similar electronic computing device, such as a telephone, smartphone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Communicating in a Computer Environment

Embodiments of the present technology are for communicating in a computer environment. A single user may be capable of communicating one-to-one with another user via user devices using no relays. However, such a connection without a relay may not be possible or may be poor quality, unreliable and lack effective scalability to extend a call to a multiparty call.

Embodiments of the present technology allow a user to communicate to at least one other user via user devices associated with a peer-to-peer computer environment. In one embodiment, a user obtains a list of potential relay peers from a tracker peer. The user device then selects at least one relay peer based on the availability and capabilities of the relay peers. An optimization scheme may be employed to make such a selection. A user device may employ one or several relay peers to communicate with a second user device.

In one embodiment, pluralities of relay peers are employed to transmit the communication to a second user device. The user device may divide the communication into portions and each portion is sent via a different relay peer. For example, the audio portion of a communication is divided from the video portion of the communication and sent over different relay peers. In one embodiment, the communication is relayed using a first relay peer and then switches to a second relay peer seamlessly during the communication.

In one embodiment, the relay peers each receive a portion of the communication and replicate the portion. The replicated portions may be sent to a plurality of user devices each being employed by a user. Thus, scalability is achieved and a multi-party communication may be achieved without loss of quality or reliability. Additionally, operations traditionally performed by central servers and infrastructure may be performed by the idle computers of end users.

In one embodiment, the user devices that are communicating have disparate capabilities. For example, the first user device may be a personal computer with a high speed Internet connection and the second user device may be a smart phone connected to a mobile network. In one embodiment, a relay peer may transcode the communication so that the communication comprises a base layer and an enhanced layer. The base layer may be sent to devices with lower capabilities and the base layer with the enhanced layer may be sent to the devices with higher capabilities.

A communication as used in the present disclosure may refer to several types of communications, including but not limited to, real-time audio and/or video communication, text messages, photo messages, video messages, error correction codes etc. wherein the communication and messages are sent and received via electronic communication devices. User devices may be, but are not limited to, telephones, computer systems, netbooks, notebooks, televisions, hand held devices, mobile devices, smart phones, cellular phones, personal digital assistants, connected televisions, etc. In the present disclosure the terms relay peer(s) or storage peer(s) refer to electronic devices that are nodes or peers in a peer-to-peer computer environment. The term tracker peer may refer to either a peer in a peer-to-peer computer environment or a server computer system.

It should be appreciated that a peer-to-peer computer environment is well known in the art and is also known as a peer-to-peer network and is often abbreviated as P2P. It should be understood that a peer-to-peer computer environment may comprise multiple computer systems, and may include routers and switches, of varying types that communicate with each other using designated protocols. In one embodiment, a peer-to-peer computer environment is a distributed network architecture that is composed of participants that make a portion of their resources (such as processing power, disk storage, and network bandwidth) available directly to their peers without intermediary network hosts or servers. Participants may be known as nodes or peers. In one embodiment, peer-to-peer technology is used to manage a cluster of nodes.

The following discussion will demonstrate various hardware, software, and firmware components that are used with and in computer systems for communicating in a peer-to-peer computer environment using various embodiments of the present technology. Furthermore, the systems and methods may include some, all, or none of the hardware, software, and firmware components discussed below.

Embodiments of Communicating in a Computer Environment

With reference now to FIG. 1, a block diagram of an environment 100 for communicating in a peer-to-peer computer environment. Environment 100 includes first user device 105, tracker peer 110, first relay peer 120, second relay peer 125, third relay peer 130, central server 135, second user device 140, third user device 145, connection line 150, and communication lines 160, 165, 170, 175, 180, and 185. Environment 100 comprises components that may or may not be used with different embodiments of the present technology and should not be construed to limit the present technology.

In one embodiment, environment 100 comprises a peer-to-peer computer environment that includes, but is not limited to, first user device 105, tracker peer 110, first relay peer 120, second relay peer 125, third relay peer 130, central server 135, second user device 140, and third user device 145. In one embodiment, each of the components is able to connect with and communicate with any other device or peer in the peer-to-peer computer environment. In one embodiment, every device or peer is not able to connect with or communicate with every other device or peer, but is at least able to connect with and communicate with one other device or peer.

In one embodiment, first user device 105 is an electronic device used for communicating in a peer-to-peer computer environment. First user device 105 may be a computer system, a netbook, a notebook, a hand held device, a mobile device, a smart phone, a cellular phone, a personal digital assistant, etc. First user device 105 must have some type of connectivity to a network such as Ethernet, WiFi, WiMax, a cellular network, 3G etc. In one embodiment, first user device 105 is required to install an application for purposes of the present technology. In one embodiment, first user device 105 is not required to install any additional application and instead may practice the present technology using technology already installed on first user device 105. For example, first user device 105 may use a web browser application to practice the present technology. In one embodiment, second user device 140 and third user device 145 comprise the same features as first user device 105.

In one embodiment, the peer-to-peer computer environment comprises a tracker peer computer system such as tracker peer 110. The purpose of tracker peer 110 is to receive a request from a user device such as first user device 105. In one embodiment, tracker peer 110 provides potential relay peers to first user device 105. For example, tracker peer 110 may provide data identifying first relay peer 120, second relay peer 125, and third relay peer 130 as peers or nodes associated with the peer-to-peer computer environment. Tracker peer 110 may be combined with other components of environment 100 to provide data to users. Tracker peer 110 also has the ability to be updated by the peer-to-peer computer environment with data regarding potential peers and central servers. In one embodiment, the peer-to-peer computer environment comprises more than one tracker peer. In one embodiment, tracker peer 110 may also operate as a relay peer or as a central server.

In one embodiment, first user device 105 identifies potential peers associated with the peer-to-peer computer environment using the list of potential peers obtained from tracker peer 110. First user device 105 then contacts each of the potential peers and assesses the potential peers' availability and capabilities. In one embodiment, an optimization scheme is employed to select relay peers from the list of potential peers.

First user device 105 may make a determination, based on user requirements, as to which potential peers may be utilized as relays peers. Such a determination may be made using an algorithm based optimization schemed factors related to the capabilities and availability of the potential peers. The capabilities of the potential peer may include the potential peer's available downlink throughput and uplink throughput as well as processing power and speed. It should be appreciated that the factors for the optimization scheme may include, but are not limited to an estimated geographical length of a path taken by a communication through the peer-to-peer computer environment, the number of hops taken by a communication through the peer-to-peer computer environment, the round trip time of a communication through the peer-to-peer computer environment, the compatibility of a network address translator (NAT) or firewall between a relay peer and the user devices, amount of available resource of the relay peer, the historic reliability of the relay peer, and the length of time the relay peer has been running the protocol.

In one embodiment, a peer may provide first user device with data identifying potential relays. First user device 105 may then contact the potential relay peers identified by the peer that were not identified by tracker peer 110 to determine if such potential relay peers may be utilized by first user device 105 as a relay peer for communications. This process may be repeated with a subset or with all of the potential relay peers identified by the peers that were not identified by tracker peer 110. In this manner first user device 105 may increase the number of potential peers that may be utilized as relay peers. In one embodiment, a list of potential relay peers is stored on user device 105 between sessions and is used to avoid having to contact tracker peer 110 for a new list every session. In one embodiment, the process of identifying additional potential relay peers is performed during idle times when first user device 105 is not performing a communication.

In one embodiment, first user device 105 may determine that first relay peer 120 may be utilized as a relay peer for communication. First relay peer 120 may be a computer system or other device associated with the peer-to-peer computer environment. In one embodiment, first relay peer 120 receives a communication from first user device 105 over communication line 160 and relays the communication to second user device 140 over communication line 180 in a one-to-one communication. In one embodiment, first relay peer 120 may receive a communication from first user device 105 and replicate the communication. The replicated communication may also be used to send the communication to both second user device 140 and third user device 145 in a multi-party communication. Thus replicating and relaying a communication to both second user device 140 and third user device 145 comprise relaying or sending a communication to a plurality of devices. It should be appreciated that a relay may require verification from a user device for each action it takes. In other words, a relay peer may require a communication sent to a relay peer from a user device to be signed by an encryption key. The encryption key is then verified using a second key. Such a step may take place each time data is received at a relay peer.

First user device 105 may send information regarding the presence status of a user to a relay peer. This information may in turn be relayed to the contacts of a user. The information may also be updated each time a user changes status.

In one embodiment, first relay peer 120 receives only a portion of a communication, second relay peer 125 receives a different portion of the communication, and third relay peer 130 receives yet a different portion of the communication from first user device 105. First relay peer 120, second relay peer 125, and third relay peer 130 then send or relay their respective portions of the communication to second user device 140. Thus a communication is relayed using a plurality of relay peers. It should be appreciated that a communication may be relayed using any number of peers and is not limited to first relay peer 120, second relay peer 125, and third relay peer 130 of FIG. 1. Additionally, first relay peer 120, second relay peer 125, and third relay peer 130 may each replicate their respective portions of the communication. In one embodiment, the replicated portions are sent to third user device 145 and the original portions are sent to second user device 140 for a multi-party communication.

In one embodiment, a communication may be divided such that one portion is audio and one portion is video. An audio or video portion may also be divided into multiple portions to be sent over multiple relay peers. For example, a communication may be divided such that the audio is divided into three portions where one portion is considered the base portion and is given priority or protection over the other portions. The two other audio portions provide additional details to the base portion such that if only the base portion is relayed to second user device 140, the audio communication will be accomplished, but each additional portion that is relayed to second user device 140 will increase the quality of the audio communication. Additionally, an audio portion may be given priority or protection over a video portion. A video portion divided into to sub-portions may similarly provide a low-resolution portion and a hi-resolution portion.

In one embodiment, the communication also includes error correcting codes. For example, forward error correction (FEC) may be employed to protect the communication data stream in the event where at least of the relay peers used for the communication is terminated. Such a termination may occur to an error, the relay peer being disconnected from the network, the relay peer being shut down, or other reasons. In one embodiment, layered coding is used to in combination with multiple path transmission for the communication. Thus, different levels of communication may be sent to different devices with different capabilities.

In one embodiment, the relay peer has the ability to transcode the communication stream before it relay the communication stream to another user device. In one embodiment, the transcoding comprises separating the communication stream into a base layer and an enhanced layer. The relay peer may send only the base layer or the base layer and the enhanced layer to a user device. In one embodiment, the relay peer has the ability to selectively determine which layers to send to which user devices based on the capabilities of the user devices. In one embodiment, the base layer comprises enough data for both a video and audio transmission at a lower resolution or data rate than the original communication. In one embodiment, the base layer comprises only audio and no video. In one embodiment, the enhanced layer is used in conjunction with the base layer at an end user device to recreate the original communication. For example, a multi-way call may include three devices two personal computers and one smart phone. In such an example, the relay peer may send the base layer and the enhanced layers to the personal computers and only the base layer to the smart phone. Thus, the relay peer may act as an effective relay for at least two heterogeneous devices that have disparate resources and capabilities.

In one embodiment, the transmitting user device may select an appropriate compression scheme for the communication. It should be appreciated that such compression scheme for digital media are well known in the art. A communication stream may comprises a combination of text, audio, video, and error correction code.

It should be appreciated that the described relay processes performed by first relay peer 120, second relay peer 125, and third relay peer 130 may be reversed where the relay peers are receiving communications or portions of communications from second user device 140 or third user device 145 and then relayed to other user devices such as first user device 105. Therefore a given relay peer in the peer-to-peer computer environment may receive a communication from a first user device then relay the communication to a second user device and also receive a communication from the second user device and relay it to the first user device. Thus a multi-party communication may include two-way communications for each user device involved. Additionally, the number of user devices in a multi-party call is not limited to first user device 105, second user device 140 and third user device 145, but may be performed using any number of user devices.

In one embodiment, relay peers may be added or removed during the communication. For example, a communication may begin utilizing two relay peers and subsequently removes a relay peer. This may be useful if second user device 140 is receiving an audio portion over first relay peer 120 and a video portion over second relay peer 120 and the video portion is terminated during the communication. Then second relay peer 125 may be removed from relaying or sending the communication. Another example may be a communication using both first relay peer 120 and second relay peer 125 to communicate to both second user device 140 and third user device 145 in a multi-party communication. In this example, if either second user device 140 or third user device 145 terminates the communication, the other user devices may continue the communication using only first relay peer 120. Conversely, more relay peers may be added to a communication as additional portions of communication are added or additional user devices are added to a multi-party communication during a communication. Adding a relay peer to replace a failed relay peer may be considered a failover relay. Thus the ability to add relay peers to a communication in progress provides scalability and reliability to a communication sent over a peer-to-peer computer environment.

In one embodiment, a relay peer sending or relaying a given portion of a communication may terminate the relaying during a communication and a second relay peer may be selected to continue relaying the remaining portion of the communication. Thus reliability for the communication is maintained during the regular churn of a peer-to-peer computer environment as peers join and leave the peer-to-peer computer environment.

In one embodiment, a relay peer may receive feedback from a user device that is receiving a communication from the relay peer. The feedback may comprise information such as the quality of the call or an amount of the communication not being received at the receiving user device. This feedback may be relayed to the sending user device. First user device 105 may decide to change relays or the number of relay peers may be adjusted based on the feedback. For example, first user device 105 may utilize first relay peer 120 and second relay peer 125 to relay a communication divided into two portions to second user device 140. In this example first relay peer 120 may receive feedback from second user device 140 that the communication quality is below a threshold. At this point in the communication, first user device 105 divides the remainder of the communication into three portions and send the three portions over first relay peer 120, second relay peer 125, and third relay peer 130 respectively. Thus third relay peer 130 was added to increase the diversity of paths used for communicating or the redundancy in the data relayed across the peer-to-peer computer environment in an attempt to increase the quality of the communication. Any number of relay peers may be added or removed in this manner during a communication.

Additionally, user device may adjust a parameter of the communication based on a feedback received from another user device via a relay peer. In one embodiment, adjusting a parameter may be adjusting an encoding rate of the communication. In one embodiment, adjusting a parameter may be adjusting a resolution communication In one embodiment, adjusting a parameter may be changing a codec used for the communication. In one embodiment, adjusting a parameter may be changing the error protection scheme of the communication.

In one embodiment, first user device 105 may communicate with second user device 140 in a one-to-one communication. For such a one-to-one communication, the present technology may be employed with or without relay peers. If a relay peer is not used, there must be compatibility of NATs and firewalls between the user devices. A protocol such as Interactive Connectivity Establishment (ICE), Traversal Using Relay NAT (TURN) or Session Traversal Utilities for NAT (STUN) may be used to accomplish a one-to-one communication without a relay peer. Layered coding and unequal error protection for the different layers is used to ensure sufficient protection for the lower layers in case of data loss. Encoding rates may also be increased or reduced during a communication.

In one embodiment, environment 100 includes central server 135. Central server 135 represents a server computer system or a group of server computer systems such as a server farm. In one embodiment, central server 135 is not employed. In one embodiment, central server 135 is utilized as a back-up system for tracker peer 110, storage peer 115, first relay peer 120, second relay peer 125, and/or third relay peer 130. Thus central server 135 may perform any of the tasks functions or services of tracker peer 110, first relay peer 120, second relay peer 125, and/or third relay peer 130. Therefore if one of the components of the peer-to-peer computer environment fails to perform its task, service or operation, central server 135 may be utilized as a failover to perform the task, service or operation. Central server 135 provides an additional layer of reliability in a peer-to-peer computer environment where peers and nodes join and leave the environment due to regular churn. In one embodiment, central server 135 is utilized as a component of routine operations in the course of a communication.

Operations of Communicating in Computer Environment

FIG. 2 is a flowchart illustrating process 200 for communicating in a peer-to-peer computer environment, in accordance with one embodiment of the present invention. In one embodiment, process 200 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 200 is performed by tracker peer 110, and first relay 120 of FIG. 1. In one embodiment, the methods may reside in a computer usable storage medium having instructions embodied therein that when executed cause a computer system to perform the method.

At 202, a tracker peer is contacted and a list of peer nodes are obtained at a user device. In one embodiment, the user device may be first user device 105 and the tracker peer may be tracker peer 110 of FIG. 1. In one embodiment, the tracker peer may be a central server.

At 204, an optimization procedure based on factors relating to the peer nodes of the list of peer nodes is employed. The optimization procedure may include an algorithm and use factors related to the capabilities and resources, such as CPU and bandwidth, of the relay peers as described above in reference to FIG. 1.

At 206, a subset of peer nodes are selected from the list of peer nodes to act as relay nodes for a communication. At 208, an appropriate compression scheme is selected for the communication at the user device.

At 210, a media format is selected for the communication. The media formats used may be those well known in the art for digital communications comprising speech, audio, video, images, text, error correction code and other digital media. For example h.264 video format may be employed, speex for audio and parity codes for error correction.

At 212, a type of encoding is selected for the communication. Encoding and decoding procedures and protocols may those that are well known in the art or may based on unique algorithms. At 214, employing error correcting code. In one embodiment, the error correction code is Forward Error Correction (FEC).

At 214, data is transmitted to at least one relay node for the at least one relay node to forward to at least one other user device, wherein the relay node is one of the subset of the peer nodes. In one embodiment, the at least one relay node and the user devices may be the user devices and relay peers described in FIG. 1.

At 216, data is received at the user device from the at least one relay node forwarded from the at least one other user.

At 218, data is transmitted to a second relay node for the second relay node to forward to the at least one other user device, wherein the second relay node is one of the subset of the peer nodes. In such a step, the first relay node may have been terminated either at the request of the user device or at the request of the relay peer at which point the second relay peer acts as a failover.

At 220, data is received from the second relay node forwarded from the at least one other user.

Figure 4:
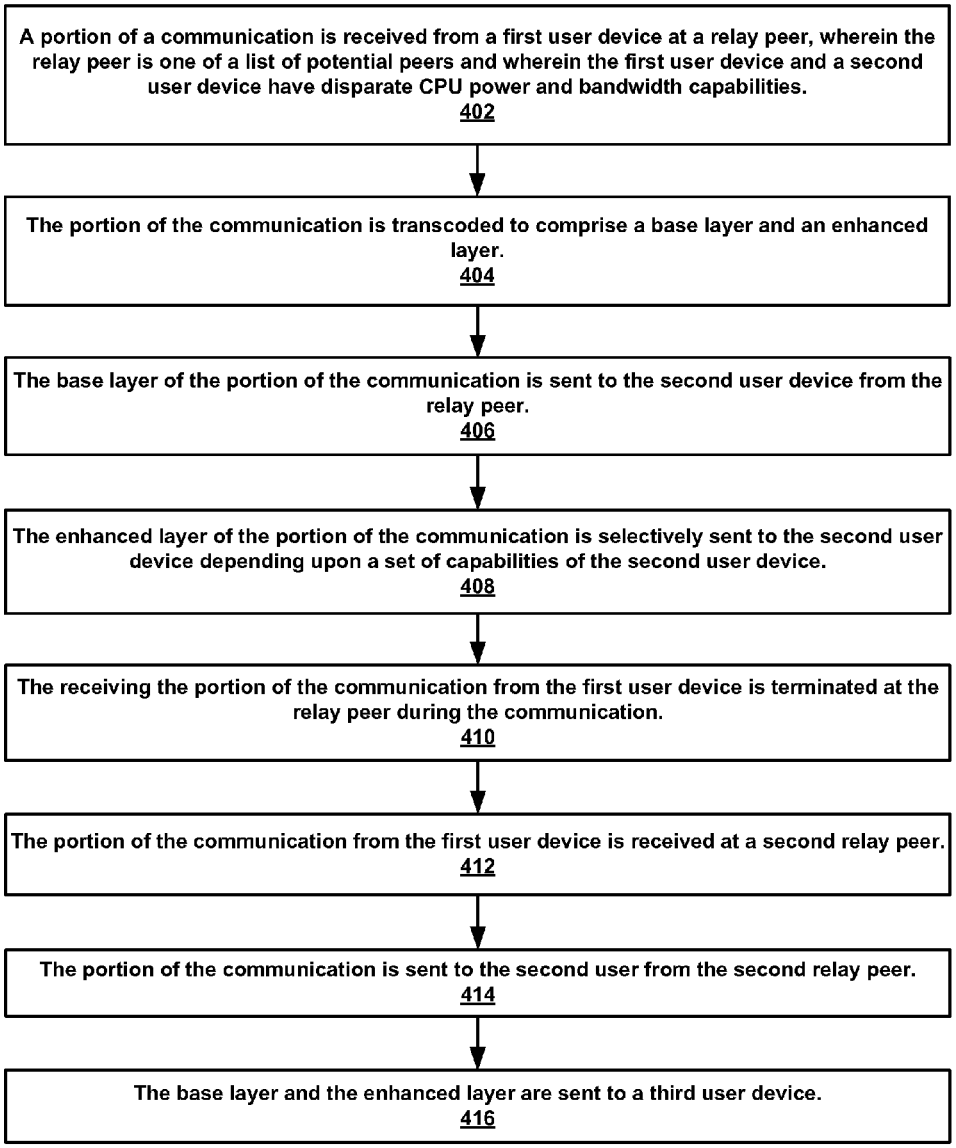
FIG. 4 illustrates a flowchart of an example method for communicating in a peer-to-peer computer environment in accordance with embodiments of the present technology.

FIG. 4 is a flowchart illustrating process 400 for communicating in a peer-to-peer computer environment, in accordance with one embodiment of the present invention. In one embodiment, process 400 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 200 is performed by tracker peer 110, and first relay 120 of FIG. 1. In one embodiment, the methods may reside in a computer usable storage medium having instructions embodied therein that when executed cause a computer system to perform the method.

At 402, a portion of a communication is received from a first user device at a relay peer, wherein the relay peer is one of a list of potential peers and wherein the first user device and a second user device have disparate CPU power and bandwidth capabilities.

At 404, the portion of the communication is transcoded to comprise a base layer and an enhanced layer. In one embodiment, transcoding encompasses changing the resolution of the communication.

At 406, the base layer of the portion of the communication is sent to the second user device from the relay peer.

At 408, the enhanced layer of the portion of the communication is selectively sent to the second user device depending upon a set of capabilities of the second user device.

At 410, the receiving the portion of the communication from the first user device is terminated at the relay peer during the communication.

At 412, the portion of the communication from the first user device is received at a second relay peer.

At 414, the portion of the communication is sent to the second user from the second relay peer.

At 416, the base layer and the enhanced layer are sent to a third user device.

It should be appreciated that processes 200 and 400 need not carry out each of the described steps to complete its operation. Nor do the steps need to be carried out in the order described. For example, these process may be for a live communication scenario where the steps take place continuously for portion after portion of the communication. In another example, in the case of video communication: one picture is encoded and transmitted by a first user device then it is separated into two layers by a relay peer. The relay peer transmits the base layer to a second user device and the base and enhancement layers to a third user device. This all takes place in no particular order. During this time the first user device is already encoding the next picture and so on.

Example Computer System Environment

Figure 3:
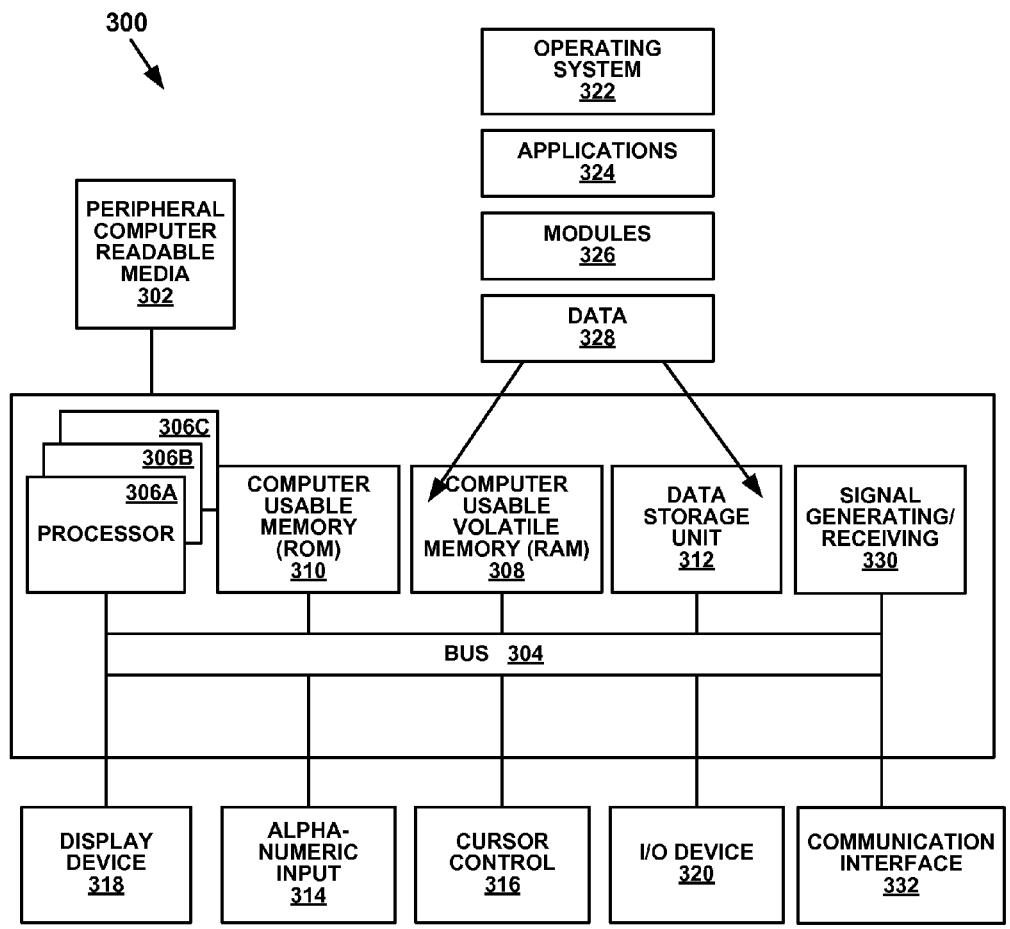
FIG. 3 illustrates a diagram of an example computer system upon which embodiments of the present technology may be implemented.

With reference now to FIG. 3, portions of the technology for providing a communication composed of computer-readable and computer-executable instructions that reside, for example, in computer-usable media of a computer system. That is, FIG. 3 illustrates one example of a type of computer that can be used to implement embodiments of the present technology.

FIG. 3 illustrates an example computer system 300 used in accordance with embodiments of the present technology. It is appreciated that system 300 of FIG. 3 is an example only and that the present technology can operate on or within a number of different computer systems including general purpose networked computer systems, embedded computer systems, routers, switches, server devices, user devices, various intermediate devices/artifacts, stand alone computer systems, mobile phones, personal data assistants, televisions and the like. As shown in FIG. 3, computer system 300 of FIG. 3 is well adapted to having peripheral computer readable media 302 such as, for example, a floppy disk, a compact disc, and the like coupled thereto.

System 300 of FIG. 3 includes an address/data bus 304 for communicating information, and a processor 306A coupled to bus 304 for processing information and instructions. As depicted in FIG. 3, system 300 is also well suited to a multi-processor environment in which a plurality of processors 306A, 306B, and 306C are present. Conversely, system 300 is also well suited to having a single processor such as, for example, processor 306A. Processors 306A, 306B, and 306C may be any of various types of microprocessors. System 300 also includes data storage features such as a computer usable volatile memory 308, e.g. random access memory (RAM), coupled to bus 304 for storing information and instructions for processors 306A, 306B, and 306C.

System 300 also includes computer usable non-volatile memory 310, e.g. read only memory (ROM), coupled to bus 304 for storing static information and instructions for processors 306A, 306B, and 306C. Also present in system 300 is a data storage unit 312 (e.g., a magnetic or optical disk and disk drive) coupled to bus 304 for storing information and instructions. System 300 also includes an optional alpha-numeric input device 314 including alphanumeric and function keys coupled to bus 304 for communicating information and command selections to processor 306A or processors 306A, 306B, and 306C. System 300 also includes an optional cursor control device 316 coupled to bus 304 for communicating user input information and command selections to processor 306A or processors 306A, 306B, and 306C. System 300 of the present embodiment also includes an optional display device 318 coupled to bus 304 for displaying information.

Referring still to FIG. 3, optional display device 318 of FIG. 3 may be a liquid crystal device, cathode ray tube, plasma display device or other display device suitable for creating graphic images and alpha-numeric characters recognizable to a user. Optional cursor control device 316 allows the computer user to dynamically signal the movement of a visible symbol (cursor) on a display screen of display device 318. Many implementations of cursor control device 316 are known in the art including a trackball, mouse, touch pad, joystick or special keys on alpha-numeric input device 314 capable of signaling movement of a given direction or manner of displacement. Alternatively, it will be appreciated that a cursor can be directed and/or activated via input from alpha-numeric input device 314 using special keys and key sequence commands.

System 300 is also well suited to having a cursor directed by other means such as, for example, voice commands. System 300 also includes an I/O device 320 for coupling system 300 with external entities. For example, in one embodiment, I/O device 320 is a modem for enabling wired or wireless communications between system 300 and an external network such as, but not limited to, the Internet. A more detailed discussion of the present technology is found below.

Referring still to FIG. 3, various other components are depicted for system 300. Specifically, when present, an operating system 322, applications 324, modules 326, and data 328 are shown as typically residing in one or some combination of computer usable volatile memory 308, e.g. random access memory (RAM), and data storage unit 312. However, it is appreciated that in some embodiments, operating system 322 may be stored in other locations such as on a network or on a flash drive; and that further, operating system 322 may be accessed from a remote location via, for example, a coupling to the internet. In one embodiment, the present technology, for example, is stored as an application 324 or module 326 in memory locations within RAM 308 and memory areas within data storage unit 312. The present technology may be applied to one or more elements of described system 300. For example, a method of modifying user interface 225A of device 115A may be applied to operating system 322, applications 324, modules 326, and/or data 328.

System 300 also includes one or more signal generating and receiving device(s) 330 coupled with bus 304 for enabling system 300 to interface with other electronic devices and computer systems. Signal generating and receiving device(s) 330 of the present embodiment may include wired serial adaptors, modems, and network adaptors, wireless modems, and wireless network adaptors, and other such communication technology. The signal generating and receiving device(s) 330 may work in conjunction with one or more communication interface(s) 332 for coupling information to and/or from system 300. Communication interface 332 may include a serial port, parallel port, Universal Serial Bus (USB), Ethernet port, antenna, or other input/output interface. Communication interface 332 may physically, electrically, optically, or wirelessly (e.g. via radio frequency) couple system 300 with another device, such as a cellular telephone, radio, or computer system.

The computing system 300 is only one example of a suitable computing environment and is not intended to suggest any limitation as to the scope of use or functionality of the present technology. Neither should the computing environment 300 be interpreted as having any dependency or requirement relating to any one or combination of components illustrated in the example computing system 300.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Overview of Communicating with a User Device

Embodiments of the present technology are for with a user device. Modern technology provides a variety of mobile handheld device. Smart phones, for example, may have more than one camera and more than one method of connecting to a network. Additionally the bandwidth and display capabilities of such devices are increasing.

Many users of computer systems have the ability to easily send real-time audio and video communication streams using their computer systems over a network. Such activities may be considered video messaging, video conferencing or the like. Embodiments of the present technology are for sending and receiving multiple communication streams using a handheld device over a network. Embodiments of the present technology may comprise both the use of handheld technology manipulating communication streams and the use of peer-to-peer computer environments for communicating.

Such communications streams may include video, audio, text and error correction code. Embodiments of the present technology allow a user to easily add or remove communications streams to an existing communication stream. For example, a user may employ a handheld device to communicate a second handheld device operated by a second user. The initial communication may start with only an audio communication stream. However, either user may initiate a second form of communication, e.g. a video stream, enabling each user to view the other user without ending the audio communication stream.

Embodiments of the present technology allow for flexibility in adding and removing communication streams to an existing communication. During an audio communication, a video communication may be initiated and terminated several times while maintaining an uninterrupted audio communication stream. Additionally, only one video stream may be sent so that a first user may view a second user without the second user viewing the first. Additionally, an audio stream may be terminated while maintaining a video communication.

Embodiments of the present technology also allow for flexibility in selecting which camera to use for a video communication stream. For example, a communication may begin with an audio stream and a video stream where the video is captured from a camera located on the front of a handheld device. During the communication the video stream may be seamlessly swapped to video that is captured from a camera located on the back of a handheld device without disrupting the audio stream. Additionally, a first user may send two video streams to a second user comprising video from both the front camera and back camera of the handheld device.

Embodiments of the present technology also allow for a seamless transition between networks. For example a user may employ a smart phone to initiate a communication with a second smart phone using a wireless card in the first smart phone. The user may then move out of range to effectively use the wireless card during the communication. At that point the smart phone may switch to a cellular network to seamlessly continue the communication. In one embodiment, the communication may change the level of resolution or level of quality to communicate more or less data depending on the difference in capabilities between the two networks.

In one embodiment, a handheld device may display a video stream that is being transmitted and simultaneously display a second video display that is being received from another handheld device. In one embodiment, the hand held device has the ability to swap the position of the two video streams being displayed on the handheld device.

In one embodiment, a handheld device is able to initiate a communication with a second handheld device by initiating contact with a data center. After the initial contact with the data center, in one embodiment, the two handheld devices are able to communicate with each other without requiring the use of the data center or another central server, but rather send and receive the communication over a network.

In one embodiment, a handheld device may provide seamless contact matching. Most smart phones employ a contact list or address book. Upon executing an application for the present technology on a smart phone, the smart phone may seamlessly filter the contacts in the contact list of smart phone to match the smart phone with other smart phones which also have installed an application for the present technology in an automatic fashion requiring no intervention from a user. Such a technique may require the use of a data center or server computer system.

These techniques may all be used in combination to allow an endless variety of initiating and terminating communication streams all during the course of one communication.

Embodiments of Communicating with a User Device

Figure 5:
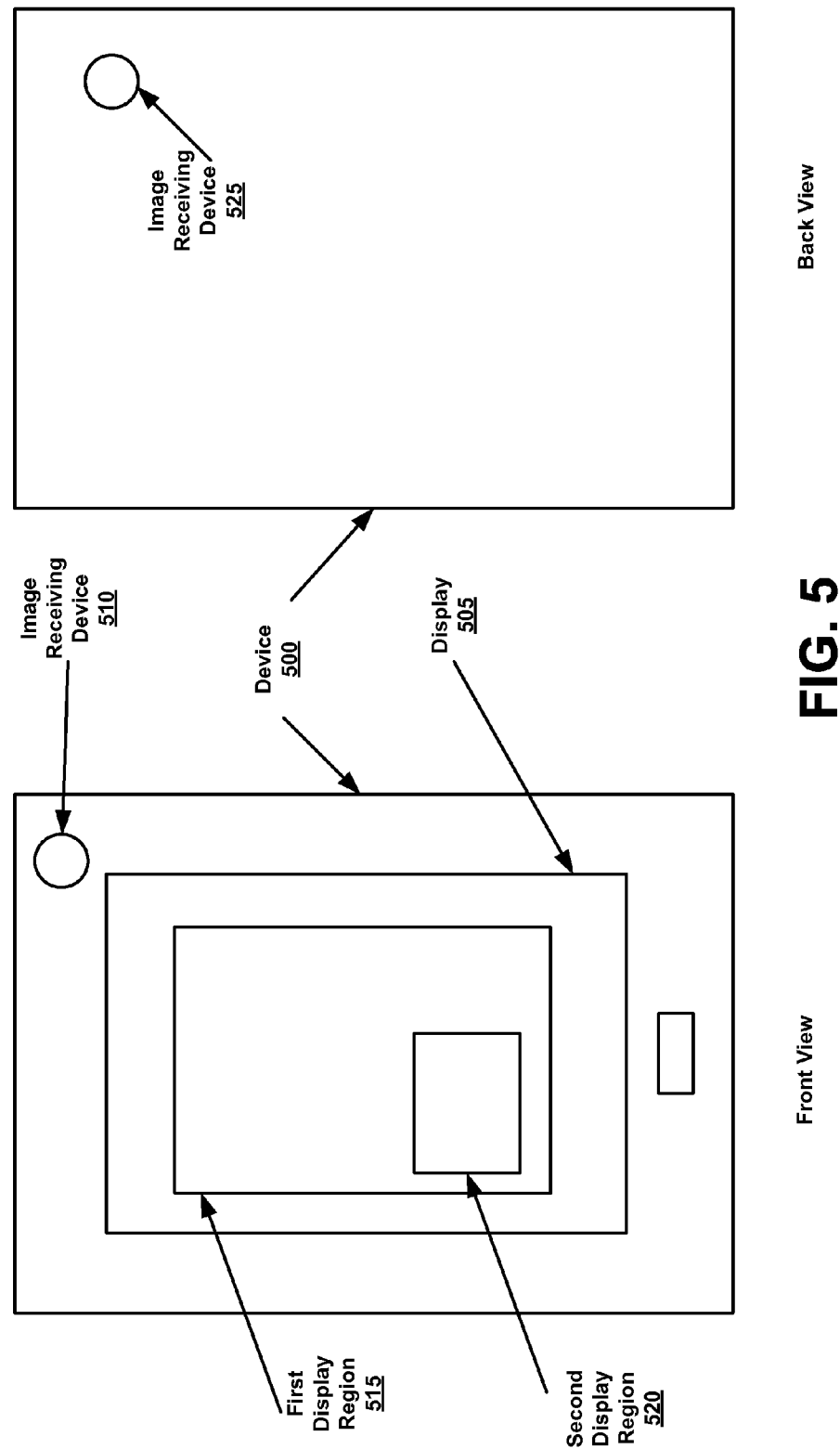
FIG. 5 illustrates a block diagram of an example user device in accordance with embodiments of the present technology.

With reference now to FIG. 5, a block diagram of a front and back view of device 500 used for communicating with a user device. Device 500 includes display 505, image receiving device 510, first display region 515, second display region 520 and image receiving device 525. Device 500 comprises components that may or may not be used with different embodiments of the present technology and should not be construed to limit the present technology.

In one embodiment, device 500 also comprises at least one means for connecting to a network. It should be appreciated that device 500 is a user device that may be, but is not limited to, a smart phone, a pda, a handheld computer, a cell phone, an iPhone®, or a smart phone with the Android® operating system by Google®.

In one embodiment, device 500 has two cameras, image receiving device 510 on the front of device 500 such that images of a user may be captured while a user is viewing display 505 and image receiving device 525 on the back of device 500. It should be appreciated that an image receiving device may be a digital camera capable of capturing either still images or video.

In one embodiment, display 505 is integrated with device 500 and is capable of displaying digital data including text, images and video. Device 500 may be a liquid crystal display or an equivalent type display. In one embodiment, display 505 is also a touch screen that is able to receive input data from a user and to display regions that allow a user to input different data into the device. In one embodiment, display 505 has a first display region 515 and a second display region 520 used for displaying video. In one embodiment, video that is being displayed in first display region 515 may be swapped with video being displayed in second display region 520. It should be appreciated that either first display region 515 or second display region 520 may display video that is captured from an image receiving device associated with device 500 or video that is captured from an image receiving device not associated with device 500.

Figure 6:
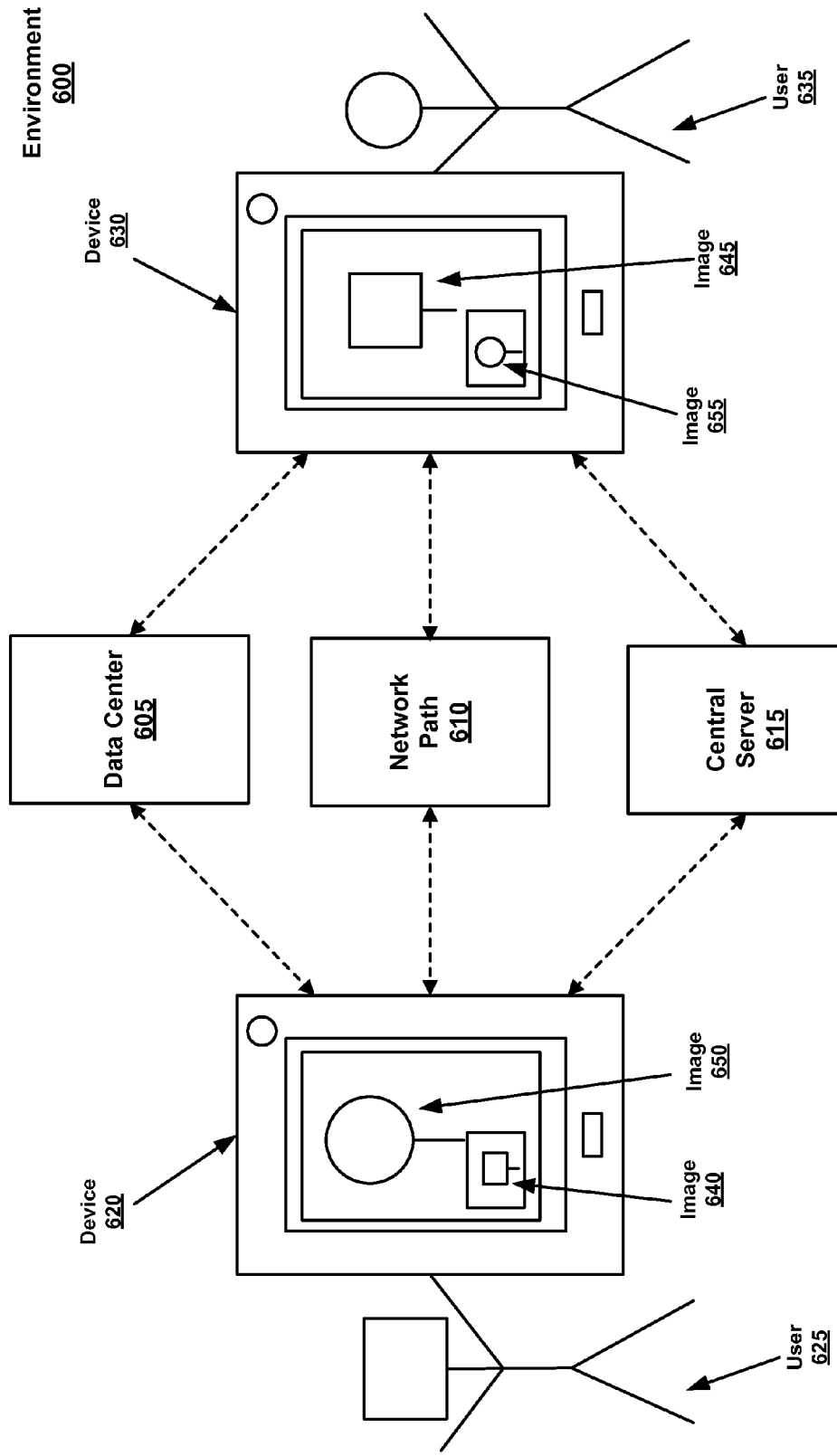
FIG. 6 illustrates a block diagram of an example environment for communicating with a user device in accordance with embodiments of the present technology.

With reference now to FIG. 6, a block diagram of environment 600 used for communicating with a user device. Environment 600 includes data center 605, network path 610, central server 615, device 620, user 625, device 630, user 635, image 640, image 645, image 650, and image 655. Environment 600 comprises components that may or may not be used with different embodiments of the present technology and should not be construed to limit the present technology.

In one embodiment, device 620 and device 630 are the same as device 500 of FIG. 5 have all of the same features and capabilities. In one embodiment, device 620 initiates a communication with device 630 by first contacting data center 605. Data center 605 then contacts device 630 and a communication is started involving at least one communication stream. It should be appreciated that the communication stream may be audio, images, text, pictures or error correction code relating to other communication streams. In one embodiment, after data center 605 initiates the communication between the devices, data center 605 no longer plays any role in the communication. In such a technique, device 620 and device 630 only use data center 605 to initiate the communication and then continue the communication over an established network without requiring the communication to be routed through a particular server. Thus communications can be hosted using very little central infrastructure.

In one embodiment, device 620 and device 630 are unable to use network path 610 for communicating with each other. This may be due to firewalls, which ports are open in a particular network, etc. In one embodiment, device 620 and device 630 may then use central server 615 which is a server computer system designed to relay the communication between the two devices. In one embodiment, central server 615 may be replaced by a peer-to-peer computer network that is described above. In one embodiment, device 620 and device 630 may not require the use of central server 615 for a length of time during a communication and may require the use of central server 615 for a different length of time during the communication. In such an example, the communication may be seamlessly routed between network path 610 and central server 615 without terminating the communication.

FIG. 6 depicts a typical arrangement of two users each using a device to communicate video and audio streams. For example, user 625 uses an image receiving device to capture video of user 625's head. This video is then displayed as image 640 on device 620 and is transmitted to device 630 where it is displayed as image 645. In turn, user 635 uses an image receiving device to capture video of user 635's head. This video is then displayed as image 655 on device 630 and is transmitted to device 620 where it is displayed as image 650. In one embodiment, device 620 is able to swap the position of image 640 and image 650. Such a swap may be performed upon receiving a request from a user. Such a request may be obtained by displaying a region superimposed over image 650. When a user touches the region, then the images will be swapped.

FIG. 6 shows device 620 which displays image 650 as a large image which comprises most of the available display and image 640 as being superimposed over image 640 and obscuring a portion of image 650. Such an arraignment is sometimes known as picture in picture. It should be appreciated that the present technology is not limited to such an arraignment but may instead display the two images such that one is not overlapping or superimposed over the other. The images may be the same size and shape or different from each other.

Figure 7:
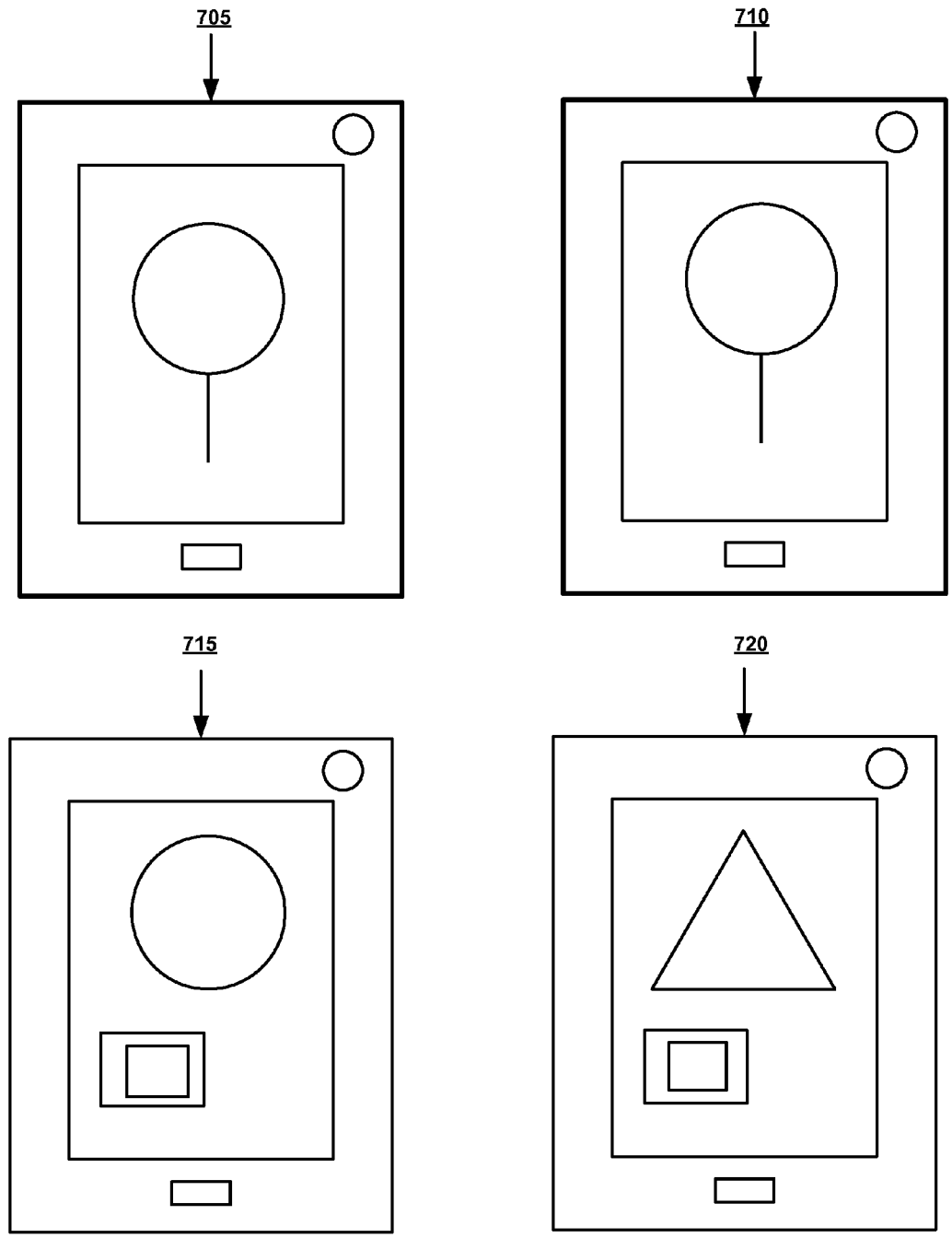
FIG. 7 illustrates a block diagram of example user devices in accordance with embodiments of the present technology.

With reference now to FIG. 7, a series of block diagrams illustrating example devices in accordance with the present technology. The images are examples and should not be construed to limit the present technology.

In one embodiment, device 705 and 710 illustrate an example of a one-way video communication where device 705 captures images or a video, displays the video on device 705, and transmits the video to device 710 and device 710 displays the video. A one-way video communication may also include an audio communication that is either one-way or two ways. Additionally, one-way video may include more than one video stream. For example, device 705 may capture images or video from two distinct image receiving devices and transmit both video streams to device 710. It should be appreciated that a one-way video communication make take place as only a portion of a communication. In other words, during the duration of a communication, portions of the communication may freely switch between two-way video, one-way video, and no video and may or may not include two-way audio.

In one embodiment, device 715 and device 720 illustrate other possible video communications. For example, device 715 may capture two video streams and transmit them to device 720, one video stream of a rectangle and one of a triangle. Device 715 is shown as displaying the rectangle in the smaller display region on the lower left portion of the display, but does not display the video of the triangle. Device 720 displays both video streams which it receives from device 715, one portion of the display shows the triangle and another portion of the display shows the rectangle. Device 720, in turns captures a video stream of a circle which it does not display but transmits to device 715 where it is shown in a large portion of the display associated with device 715. Moreover, devices 715 and 720 may also be communicating using other forms of communication, such as audio or text, simultaneous to the described video communications. Such additional communications may be one-way or two way and may start and stop during the overall communication and may take place simultaneous to a video communication or may take place during a time period in between two video communications.

Therefore it is demonstrated that a communication may employ a plurality of video streams, a plurality of audio streams, and/or a plurality of other communication streams. Additionally, the streams may start or stop periodically throughout the communication and the streams may be one-way or two-way. Additionally a communication is not limited to only two device but may include more than two devices in a multi-party communication where an endless possibility communication streams may be employed during a single communication.

In one example, a communication may begin with only audio streams. A video stream or streams may then be added. Later the video stream or streams may be terminated while maintaining the audio streams. Video streams may then be added again later.

In one embodiment, a touchscreen may be used as part of a device. Portions of the display on the touchscreen may be display regions designated to receive input from a user using techniques well known in the art of touchscreens. For example, three regions may be employed at the bottom of the display and a fourth region the top right portion of the display that may be used with the touchscreen device to control to manipulate which communications streams are displayed, received and transmitted and also the position of the displayed images. This may include regions which act as buttons to mute or terminate an audio stream or video stream. It should be appreciated that a touchscreen is not required to use the present technology. In one embodiment, hardware buttons are used to manipulate and control the communication streams. Additionally a combination of a touchscreen and hardware buttons may be used.

Operations of Communicating with a User Device

Figure 8:
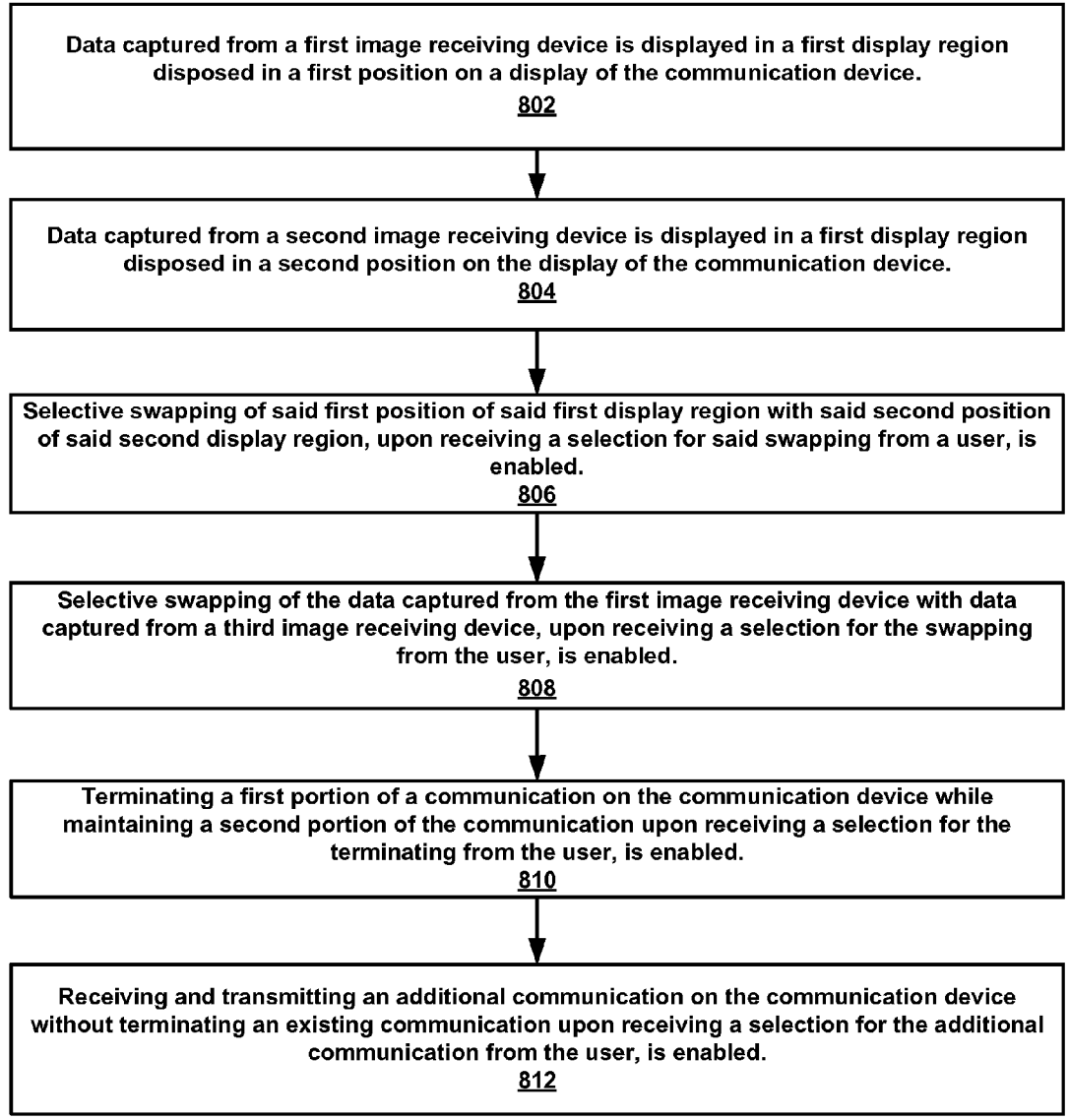
FIG. 8 illustrates a flowchart of an example method for manipulating images on a display of a communication device in accordance with embodiments of the present technology.

FIG. 8 is a flowchart illustrating process 800 for communicating with a user device, in accordance with one embodiment of the present invention. In one embodiment, process 800 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In various embodiments, process 800 may be performed by the devices and components depicted in FIGS. 1, 3, 5, 6 and 7. In one embodiment, the methods may reside in a computer usable storage medium having instructions embodied therein that when executed cause a computer system to perform the method.

At 802, data captured from a first image receiving device is displayed in a first display region disposed in a first position on a display of the communication device. For example, the first image receiving device may be a camera associated with the communication device which may be a smart phone and the data captured and displayed is a video.

At 804, data captured from a second image receiving device is displayed in a first display region disposed in a second position on the display of the communication device. For example, the second image receiving device may be a camera not associated with the communication device which may be a smart phone and the data captured and displayed is a video.

At 806, selective swapping of said first position of said first display region with said second position of said second display region, upon receiving a selection for said swapping from a user, is enabled. This feature may be useful if a user is transmitting a video while simultaneously receiving a video. The user may be more concerned with what the image being transmitted looks like and may therefore desire to have the image being transmitted displayed as the larger image.

At 808, selective swapping of the data captured from the first image receiving device with data captured from a third image receiving device, upon receiving a selection for the swapping from the user, is enabled. In one embodiment, this feature allows a device to either display two sets of data both captured with image receiving devices associated with the communication device or display data from two image receiving devices not associated with the communication device. In one embodiment, this feature allows a communication device to terminate data being captured and displayed by an image receiving device with another image receiving device.

At 810, terminating a first portion of a communication on the communication device while maintaining a second portion of the communication upon receiving a selection for the terminating from the user, is enabled.

At 812, receiving and transmitting an additional communication on the communication device without terminating an existing communication upon receiving a selection for the additional communication from the user, is enabled.

Figure 9:
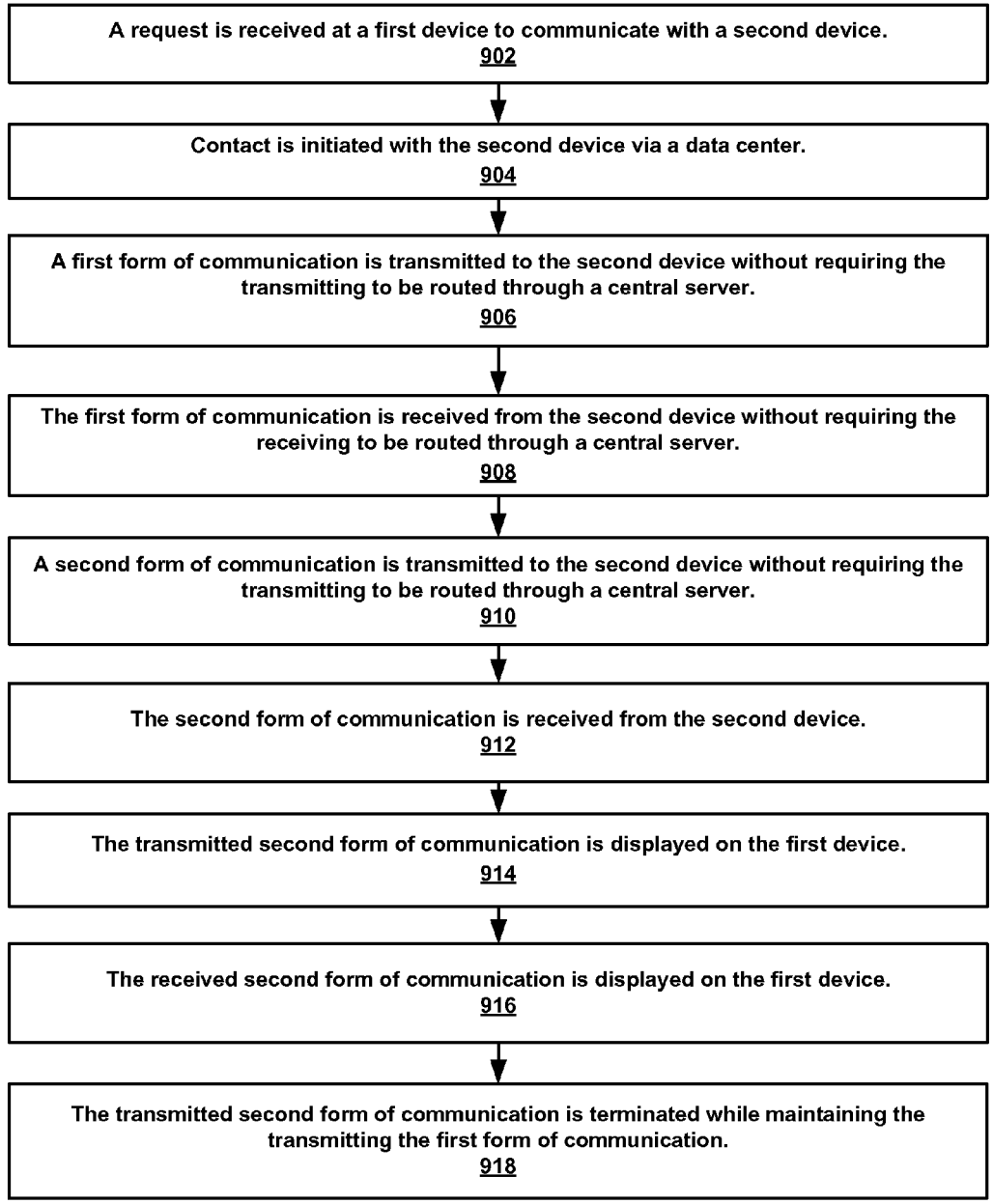
FIG. 9 illustrates a flowchart of an example method for communicating in accordance with embodiments of the present technology.

FIG. 9 is a flowchart illustrating process 900 for communicating, in accordance with one embodiment of the present invention. In one embodiment, process 900 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In various embodiments, process 900 may be performed by the devices and components depicted in FIGS. 1, 3, 5, 6 and 7. In one embodiment, the methods may reside in a computer usable storage medium having instructions embodied therein that when executed cause a computer system to perform the method.

At 902, a request is received at a first device to communicate with a second device.

At 904, contact is initiated with the second device via a data center.

At 906, a first form of communication is transmitted to the second device without requiring the transmitting to be routed through a central server.

At 908, the first form of communication is received from the second device without requiring the receiving to be routed through a central server.

At 910, a second form of communication is transmitted to the second device without requiring the transmitting to be routed through a central server.

At 912, the second form of communication is received from the second device.

At 914, the transmitted second form of communication is displayed on the first device.

At 916, the received second form of communication is displayed on the first device.

At 918, the transmitted second form of communication is terminated while maintaining the transmitted first form of communication.

FIG. 10 is a flowchart illustrating process 1000 for automatic contact filtering, in accordance with one embodiment of the present invention. In one embodiment, process 1000 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In various embodiments, process 1000 may be performed by the devices and components depicted in FIGS. 1, 3, 5, 6 and 7. In one embodiment, the methods may reside in a computer usable storage medium having instructions embodied therein that when executed cause a computer system to perform the method.

At 1002, data associated with a contact list is received at a computer system from a handheld device, wherein the data was sent automatically from the handheld device without requiring actions from a user. In one embodiment, an application in accordance with the present technology is installed on a device. The application may access a contact list or address book associated with the device. The contact list may have information regarding names, phone numbers, email addresses, etc. This data is then sent to a computer system. For example the computer system could be data center 605 of FIG. 6. The data may be sent automatically without require a user to request or send the data manually. In one embodiment, the application will seek and receive permission from the user before accessing the contact list.

At 1004, the data associated with the contact list is normalized using an algorithm. In one embodiment, this takes place in a computer system. The normalizing may include reorganizing the data associated with the contact list such that it can be easily compared to other contact data. For example, a contact list may have phone numbers that include local phone numbers and international phone number that include a prefix. The normalizing can identify items such as area codes and international prefixes and then properly classify or organize this data to be compared with other data.

At 1006, the normalized data is compared with data in a database. The other data in the database may be information regarding other devices that also have installed an application in accordance with embodiments of the present technology.

At 1008, contact matches are established between the data associated with the contact list and contacts in the database. It should be appreciated that the present technology is not limited to a database and may also use some other type of electronic records. For example, a first user may install the application on a first device at which point the name of the user and phone number for the device are sent to the database. Then a second user may input the name and phone number of the first user in a second device. Once the second user installs the application, the contact data regarding the first user, which is stored in the second device, is normalized and compared with the data base. A match to the first user will be found. Then, at 1010, the matches are reported to the handheld device. Thus the second user will be able to contact the first user via the installed application and the components of the device.

FIG. 11 is a flowchart illustrating process 1100 for communicating, in accordance with one embodiment of the present invention. In one embodiment, process 1100 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In various embodiments, process 1100 may be performed by the devices and components depicted in FIGS. 1, 3, 5, 6 and 7. In one embodiment, the methods may reside in a computer usable storage medium having instructions embodied therein that when executed cause a computer system to perform the method.

At 1102, a tracker peer is contacted and obtaining a list of peer nodes at a user device.

At 1104, a subset of peer nodes are selected from the list of peer nodes to act as relay nodes for a communication.

At 1106, a first form of communication is transmitted to at least one relay node for the at least one relay node to forward to at least one other user device, wherein the relay node is one of the subset of the peer nodes.

At 1108, the first form of communication is received at the user device from the at least one relay node forwarded from the at least one other user.

At 1110, a second form of communication is transmitted to the at least one relay node for the at least one relay node to forward to the at least one other user device, wherein the relay node is one of the subset of the peer nodes.

It should be appreciated that processes 800, 900, 1000, and 1100 need not carry out each of the described steps to complete its operation. Nor do the steps need to be carried out in the order described.

The invention claimed is:

1. A method for communicating, said method comprising:
   receiving a request, at a first device, to communicate with a second device, wherein said first device and said second device are peers in a peer-to-peer computer environment;
   initiating contact with said second device via a data center;
   transmitting a first form of communication to said second device over said peer-to-peer computer environment without requiring said transmitting to be routed through a central server;
   receiving said first form of communication from said second device without requiring said receiving to be routed through a central server; and
   transmitting a second form of communication to said second device over said peer-to-peer computer environment without requiring said transmitting to be routed through a central server.

2. The method as recited in claim 1, further comprising:
   receiving said second form of communication from said second device.

3. The method as recited in claim 2, further comprising:
   displaying said receiving said second form of communication on said first device.

4. The method as recited in claim 1 wherein said transmitting said first and second form of communication and receiving said first form of communication occur simultaneously.

5. The method as recited in claim 1, further comprising:
   displaying said transmitting said second form of communication on said first device.

6. The method as recited in claim 1 wherein said first form of communication is an audio communication and wherein said second form of communication is a video communication.

7. The method as recited in claim 6 wherein said audio communication is compressed using Speex audio encoder.

8. The method as recited in claim 1, further comprising:
   terminating said transmitting said second form of communication while maintaining said transmitting said first form of communication.

9. The method as recited in claim 1 wherein said transmitting and receiving said first form of communication occurs for a period of time before said transmitting said second form of communication occurs.

10. The method as recited in claim 1 wherein said transmitting and said receiving further comprises transmitting and receiving error correction code.

11. A non-transitory computer-usable storage medium having instructions embodied therein for causing a computer system to perform the steps of communicating:
    receiving a request, at a first device, to communicate with a second device, wherein said first device and said second device are peers in a peer-to-peer computer environment;
    initiating contact with said second device via a data center;
    transmitting a first form of communication to said second device over said peer-to-peer computer environment without requiring said transmitting to be routed through a central server;
    receiving said first form of communication from said second device without requiring said receiving to be routed through a central server; and
    transmitting a second form of communication to said second device over said peer-to-peer computer environment without requiring said transmitting to be routed through a central server.

12. The non-transitory computer-usable storage medium of claim 11, further comprising:
    receiving said second form of communication from said second device.

13. The non-transitory computer-usable storage medium of claim 12, further comprising:
    displaying said receiving said second form of communication on said first device.

14. The non-transitory computer-usable storage medium of claim 11, further comprising:
    displaying said transmitting said second form of communication on said first device.

15. The non-transitory computer-usable storage medium of claim 11, further comprising:
    terminating said transmitting said second form of communication while maintaining said transmitting said first form of communication.

* * * * *